Patented Sept. 26, 1922.

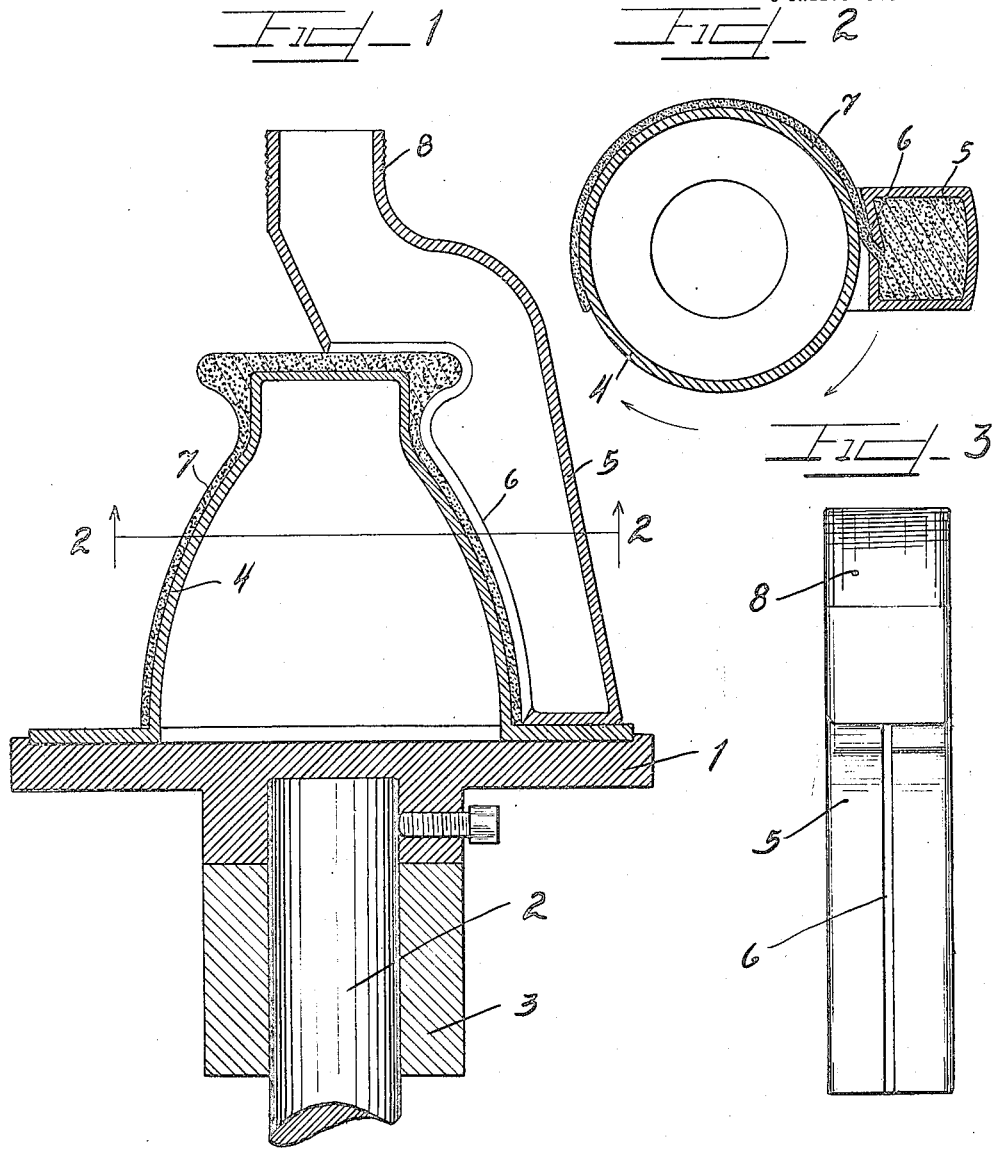

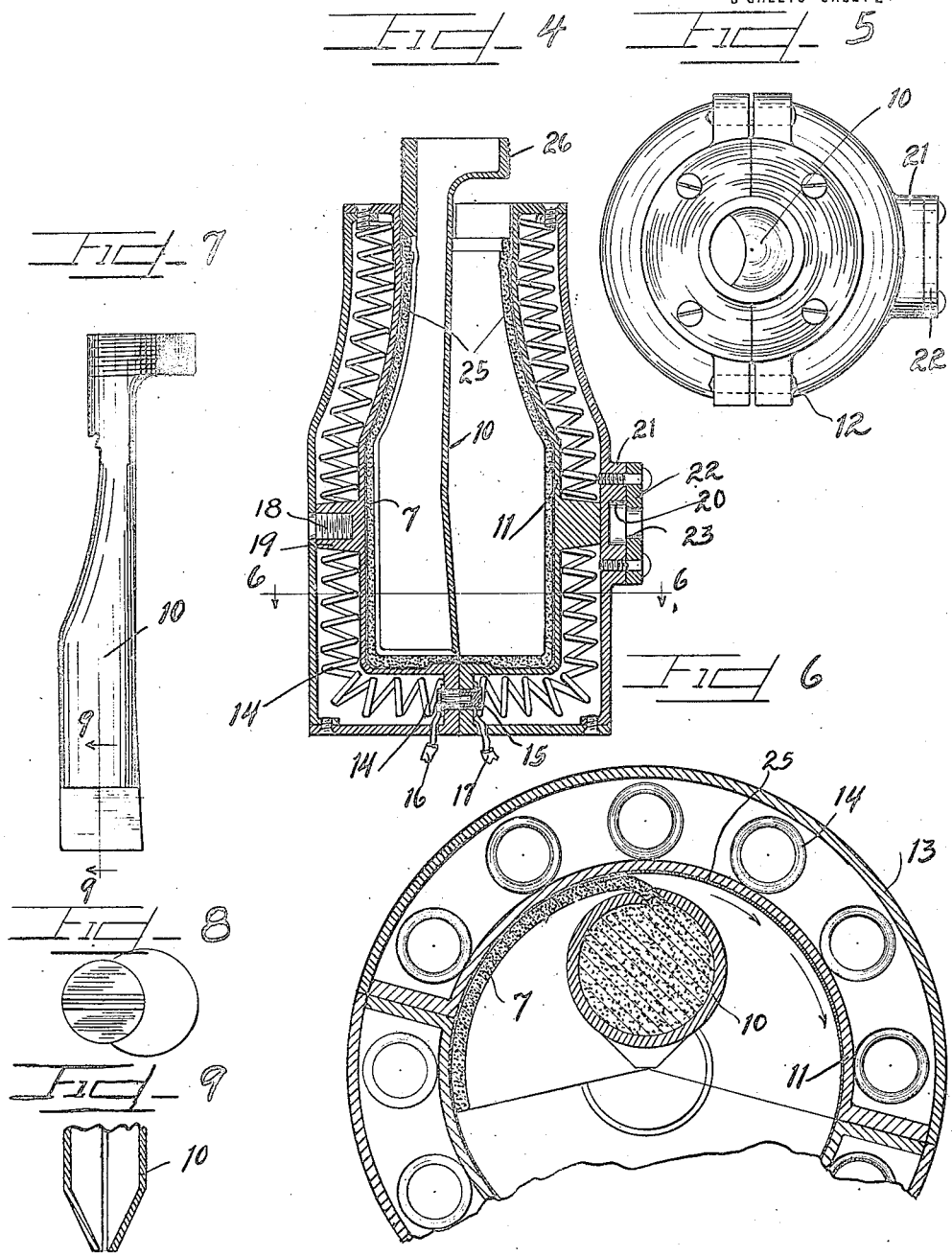

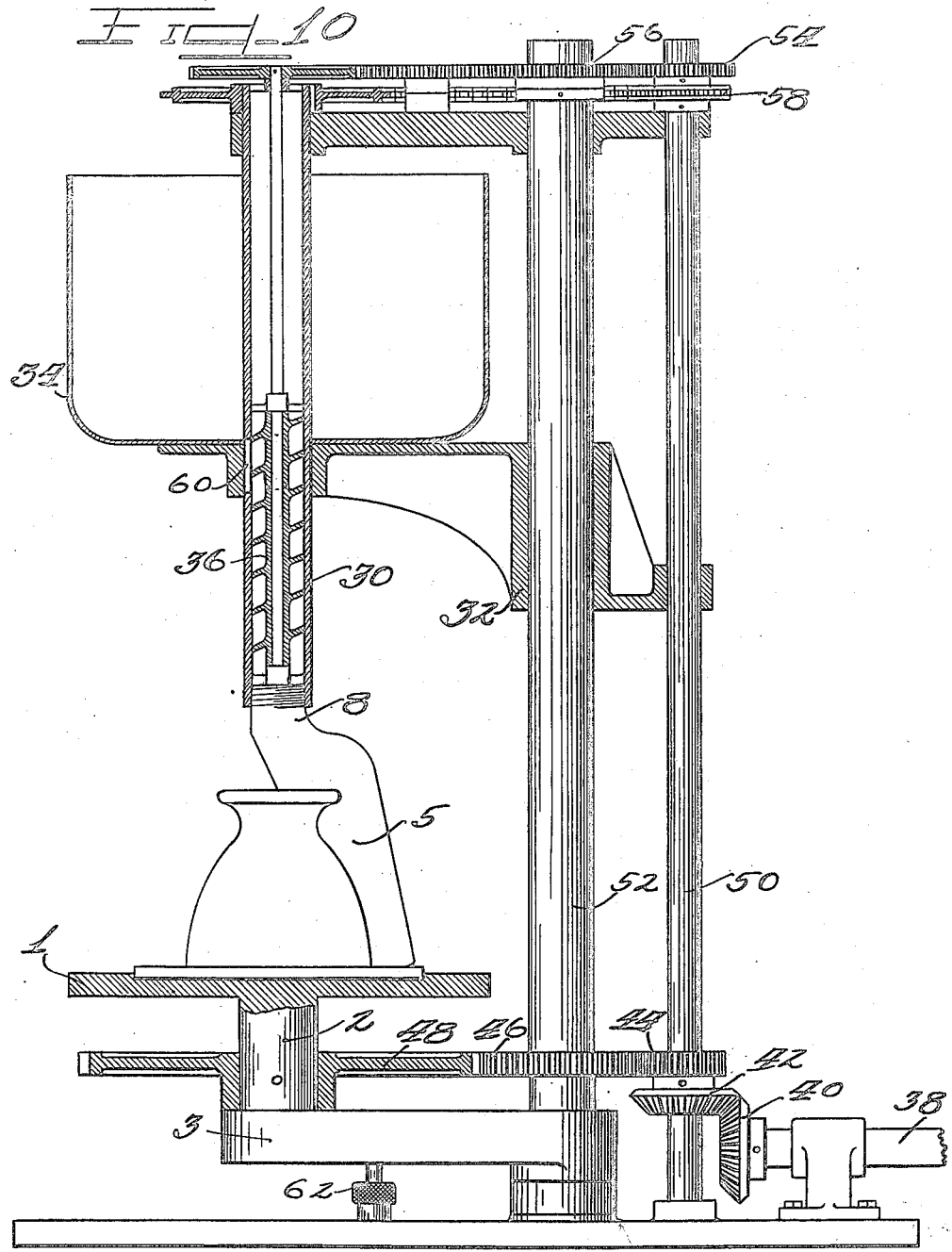

1,430,363

UNITED STATES PATENT OFFICE.

CHARLES S. DOLLEY, OF NELSON, NEW HAMPSHIRE.

PROCESS AND APPARATUS FOR APPLYING AND SHAPING PLASTIC MATERIAL.

Application filed December 5, 1919. Serial No. 342,677.

*To all whom it may concern:*

Be it known that I, CHARLES S. DOLLEY, a citizen of the United States, and a resident of the town of Nelson, in the county of Cheshire and State of New Hampshire, have invented certain new and useful Imrovements in Processes and Apparatus for Applying and Shaping Plastic Material; and I do hereby declare that the following is a full, clear, and exact description of the same, reference being had to the accompanying drawings, and to the numerals of reference marked thereon, which form a part of this specification.

The potter's wheel has been used from the earliest times and is employed at the present time under the name of a jigger in connection with a templet, profile or shaping tool for giving form to clay or plastic material previously placed on the wheel or on a suitable mold, support or form carried by the wheel, as in such prior apparatus, the material is placed upon the jigger or wheel in a mold or about a core, as the case may be, prior to and independently of the application of any shaping tool or profile thereto, the sole function of the latter is to spread the previously applied plastic material smoothly and uniformly over the surface of the mold or core.

One of the objects of the present invention is to provide means for applying plastic material to a mold or core simultaneously with the application of the profile or shaping tool to the mold or core.

A further object of the invention is to provide a profile or shaping tool adapted to convey the plastic material to the mold or core as well as to shape it and smooth its surface.

It is also an object of the present invention to provide easy and rapid means of making hollow ware from plastic materials.

Other and further important objects of this invention will be apparent from the disclosures in the drawings and specification.

Two preferred forms of apparatus for carrying out my invention are illustrated in the drawings, in which:

Figure 1 is a central section through an apparatus for carrying out my improved process.

Figure 2 is a section on the line 2—2 of Figure 1.

Figure 3 is a side elevation of the plaster container.

Figure 4 is a central section through a modified form of apparatus.

Figure 5 is a plan view of the same.

Figure 6 is a section on the line 6—6 of Figure 4.

Figure 7 is a side elevation of the plaster container.

Figure 8 is a bottom plan view of the same.

Figure 9 is a section on the line 9—9 of Figure 7.

Figure 10 is a partial sectional view, showing the connection of the profile to the material holding vat and the feed means therein.

As shown in the drawings:

Two forms of apparatus are illustrated, one in which the article is molded around a core and the other in which the article is formed against the inner face of a mold. In the first form of construction, shown in Figures 1 to 3 and 10, a jigger is employed comprising a table 1 mounted at the upper end of a rotatable shaft 2 journalled in a bearing 3. On top of the table is placed a core 4, about which the article is to be formed. A recess is provided in the upper surface of this table into which the flanged base of the core fits and is thereby releasably held concentrically with respect to the shaft 2. Adjacent one side of the core 4 is arranged a hollow profile 5 for the plastic material. One side of this profile is shaped to conform with that of the completed article and along that side a slit 6 is provided through which the plastic substance may be extruded in the form of a thin sheet 7. This slot is inclined in the direction of rotation of the core so as to guide the sheet 7 onto the latter during its rotation.

The profile 5 may be supported by a "pull-down" such as those now in use where profiles or shaping tools are employed in connection with jiggers. For this purpose, the profile 5 is provided with an upward extension 8 for threaded engagement with a pipe 30 carried by the pull-down support 32 concentrically with the jigger. In sliding communication with this pipe is a mixing chamber 34 for the plastic material to be fed into the profile. Means are also provided for producing the necessary pressure to extrude the plastic material from the slot 6 such as a connection between the above mentioned pipe and a source of compressed air or in other cases a worm or other conveyor 36 operating in the pipe leading from the mixing chamber to the profile.

As shown in Figure 10, the table or jigger is rotated by means of the driving shaft 38, bevel gears 40 and 42 and driving gears 44, 46 and 48 on the shafts 50, 52 and 2 respectively. The shafts 50 and 52 extend vertically upwards through bearings which support the bracket 32, and have keyed to their tops gears 54 and 56 and a sprocket 58 for operating the profile revolving mechanism and the worm feed, as shown. A hole 60 is provided in the pipe 30 which, when the pipe is in a raised position, is adapted to allow material to flow from the vat or container 34 into the pipe from whence it is fed by the worm 36 to the profile 5.

A locking means or latch 62 of any suitable construction is provided in order to maintain the jigger or table 1 in its proper working position while an article is being formed.

Preferably the apparatus is arranged so that the jigger is placed in rotation and the plastic extruding means are thrown into operation as soon as the pull-down has brought the profile into the position shown in Figures 1 and 10. In this way the plastic material is extruded simultaneously with the rotation of the core so that the layer of material passing outwards through the slot is lapped around the core. In some cases the apparatus may be arranged so that the profile rotates around a stationary core.

Preferably, particularly when a quick hardening material is employed, the profile is of such size that it will hold just sufficient material completely to surround the core and cause the edges of the applied layer to overlap so that a good joint is formed. As shown in Figure 2, the rear edge of the profile is shaped so that it will act as a trowel or smoothing tool to compress the overlapping edges together and make a smooth, homogeneous union between the two edges.

After several rotations of the jigger, the article is finished and the jigger is swung to one side after which the profile may be raised. Preferably upward movement of the pull-down to raise the profile throws the jigger to one side and the plastic extruding means out of operation. The profile may then if desired, be washed out before receiving the next charge.

When the material is fed to the profile in a solid stream, as in case where slow hardening plastic materials are employed, means may be provided for throwing the extruding means out of operation as soon as sufficient plastic has been applied to the core.

While the foregoing apparatus is well adapted for making bowls and the like having a mouth wider than their base so that the completed article may be lifted off the core, it is not as well suited for making bottle-shaped ware as that shown in Figures 4 to 9. In this case the profile 10 is inserted within a mold 11 and relative rotation of the parts is produced to apply a layer of plastic composition to the interior of the mold.

In this apparatus the internal diameter of the neck of the mold must not exceed the internal radius of the body of the mold since the slot in the profile must extend to the center of the bottom of the mold to ensure that the latter is completely covered while the profile must be small enough in diameter so that it may be inserted into the mold and withdrawn after the article has been formed.

The profile in this case also is raised and lowered by a pull-down. As the profile is rotated, however, its threaded upper end 26 is secured to the end of a rotatable pipe journalled in bearings eccentrically mounted in the pull-down so that by adjusting the angular position of the bearings relatively to the pull down the profile may be laterally displaced for the purpose of inserting it within and withdrawing it from the mold. Suitable sliding rotatable and laterally flexible connections may be provided between this rotating pipe and the plastic mixing chamber.

As the completed article cannot be withdrawn through the top of the mold the latter is made in two halves releasably held together by suitable means such as clamping bolts 12 so that they may be separated for the purpose of withdrawing the completed article.

It is undesirable to allow the articles to set in the molds, especially when slow hardening plastic materials are used, as this would involve the use of an excessive number of molds which are of heavy and expensive construction. I prefer, therefore, to employ thin metallic liners of brass or other rustless metal or alloy which may be removed with the formed articles and allowed to remain thereon until the plastic material has set and shrunk away from the liners when they may be removed. It is not essential to treat the surface of the liners with oil or other material to prevent the adhesion of the plastic, although preferably such surfaces are kept highly polished to aid the separation of the liners from the hollow ware, and to give a polished surface to the ware itself.

In the form of construction illustrated the mold 11 is provided with an outer shell 13 to provide a double-walled construction between the walls of which suitable heating means may be employed for aiding the drying of the plastic material or its setting when heat hardened substances such as vulcanizable materials or phenolic condensation products are used. For this purpose coils 14 of electric resistance wire may be employed symmetrically arranged between the walls 11 and 13 and provided with suitable terminals 14 and 15 for attachment to leads 16 and 17 connected to a suitable source of electrical current.

When the mold is provided with heating means each half may be furnished with handles to avoid contact with the heated outer surface of the shell 13. Various means may be employed for attaching these handles, such as a threaded aperture 18 in a lug 19 on the mold 11, or a recess 20 in a boss 21 on the shell 13, for the reception of the enlarged end of a handle held in place by a plate 22 having a central aperture 23 of smaller diameter than the recess 20.

Various kinds of plastic material may be employed in manufacturing hollow ware by means of the present process and apparatus.

Several compositions are known and of these one of the most suitable is a mixture of calcined magnesite, magnesium chloride and a combining material such as silica, talc, or the equivalent. In practice I have obtained very good results with the following mixture:

Calcined magnesite _____ 40%
Magnesium chloride solution, 22° Bé__ 20%
Fine silica _____ 40%

The above mixture requires about five hours to harden so that it is not necessary to clean the profile between each operation to prevent solidification of the plastic material therein.

Preferably the containers are made impervious to fluids by impregnating or coating their surfaces with suitable materials such as are well known in the art.

Preferably the mixing of the plastic composition takes place in a vacuum to obtain a mixture free from air so that the articles produced therefrom will be free from voids. When quick setting material is used, it is advantageous to mix only sufficient materials for a single charge for the profile.

My improved apparatus may also be employed to good advantage for molding drain pipes, tiles, conduits and such like articles; for forming cornices, moldings or other relief ornamentation; and in general, the invention may be adapted to a wide range of uses where it is desired to deposit a layer or coating of plastic material in accordance with a particular form or contour. I believe I am the first to devise a practical method and apparatus for depositing plastic material in a layer or coating in accordance with any desired form or contour and therefore it is to be understood that I do not limit my invention to the precise embodiment of the apparatus as herein shown and described.

I claim as my invention:

1. A device of the kind described comprising a circular support, means for extruding a layer of plastic material onto the surface of the support, and means for simultaneously producing relative rotation of the support and said means.

2. A device of the kind described comprising a support, means for heating one surface of the support, means for extruding a layer of plastic material over the surface of the support, and means for simultaneously producing relative rotation of the support and said means.

3. A device of the kind described comprising a support, a hollow member for containing plastic material adjacent one surface of said support having a slot therein extending from the center of the support to a point adjacent the periphery of the latter, and means for forcing plastic material outwardly through said slot onto the surface of the support, and means for simultaneously producing relative rotation of the support and said means.

4. A device of the kind described comprising a double-walled support, heating means arranged between the walls of said support, a hollow member for containing plastic material adapted to be inserted within said support having a slot therein extending from the center of the support to a point adjacent the periphery of the latter, means for forcing plastic material outwardly through said slot over the surface of the support, and means for simultaneously producing relative rotation between the support and said member.

5. A device of the kind described comprising a bottle-shaped support whose neck has an internal diameter greater than the internal radius of the body portion, a hollow member for containing plastic material adapted to be inserted within said support having a slot therein extending from the center of the support to a point adjacent the periphery of the latter, means for forcing plastic material outwardly through said slot over the surface of the support, and means for simultaneously producing relative rotation between said member and said support.

6. A device of the kind described comprising a double-walled support, heating means arranged between the walls of the support, a hollow member for containing plastic material adjacent one surface of said support having a slot therein extending from the center of the support to a point adjacent the periphery of the latter, means for forcing plastic material outwardly through said slot over the surface of the support, and means for producing relative rotation of the support and said member.

7. A device of the kind described comprising a mold, a thin metallic liner for the mold, and means for applying a layer of plastic material to said liner.

8. A device of the kind described comprising a support, a thin metallic member fitting said support, and means for applying a layer of plastic material to said member.

9. A device of the kind described comprising a circular support and a hollow slotted profile adapted to convey plastic material to the support as well as shape it and smooth its surface.

10. A device of the kind described comprising a circular support, means for applying a layer of plastic material to the surface of the support, and means for simultaneously producing relative rotation of the support and said means.

11. A device of the kind described comprising a support, a thin metallic member detachably fitting said support having its exposed surface polished, and means for applying a layer of plastic material to the polished surface of said member.

12. A device of the kind described comprising a support, a hollow member for containing plastic material adjacent one surface of the support having a slot therein extending from the center of the support to a point adjacent the periphery of the latter, means for forcing plastic material outwardly through said slot onto the surface of the support, and means for simultaneously producing relative rotation of the support and said means, said slot being rearwardly inclined with respect to the direction of movement of the member relatively to the support.

13. A device of the kind described comprising a circular support, a hollow member for containing plastic material adjacent one surface of said support having a slot therein for extruding a layer of plastic material onto the surface of the support, and means for producing relative rotation of the support and said member, the said member being spaced from the support substantially the thickness of such layer whereby the plastic material applied to the support is smoothed by the member during its movement relative to the support.

14. A device of the kind described comprising a circular support, a hollow member adapted to contain a weight of plastic material substantially equal to that of the article to be formed, said member having a slot therein for extruding a layer of plastic material therethrough onto the surface of the support, and means for simultaneously producing relative rotation of the support and said member.

15. A device of the kind described comprising a support, a hollow member adapted to contain a weight of plastic material substantially equal to that of the article to be formed, said member having a slot therein for extruding a layer of plastic material therethrough onto the surface of the support, and means for producing relative rotation of the support and said member, the said member being spaced from the support substantially the thickness of such layer whereby the plastic material applied to the support is smoothed by the member during its movement relative to the support.

16. A device of the kind described comprising a support, a hollow member for containing plastic material adjacent one surface of the support having a slot therein, means for forcing plastic material outwardly through said slot onto the surface of the support, and means for producing relative rotation of the support and said member.

17. A device of the kind described comprising a support, a hollow member for containing plastice material adjacent one surface of the support having a slot therein, means for forcing plastic material outwardly through said slot onto the surface of the support, and means for producing relative rotation of the support and said member, said slot being inclined to guide the extruded plastic material in a direction opposite to such rotation.

18. In a device of the character specified, a combined holder and shaper for plastic material, and means to extrude the material from the holder to deposit it in a layer.

19. In a device of the character specified, the combination of an integral movable holder and shaper for plastic material and means to force the material through the holder to extrude it in a continuous layer.

20. In a device of the character specified, the combination with a hollow profile, of means to extrude plastic material from the profile to deposit it in a layer shaped to the contour of the profile.

21. In a device of the character specified, the combination of a profile having a slot in its face and means to feed plastic material through said slot to deposit it in a layer shaped to the contour of the profile.

In testimony whereof I have hereunto subscribed my name in the presence of two subscribing witnesses.

CHARLES S. DOLLEY.

Witnesses:
 CARL M. PAGE,
 RIDSDALE ELLIS.